US009626121B2

(12) United States Patent
Camp et al.

(10) Patent No.: US 9,626,121 B2
(45) Date of Patent: Apr. 18, 2017

(54) DE-DUPLICATION AS PART OF OTHER ROUTINELY PERFORMED PROCESSES

(71) Applicant: International Business Machines Corporation, Armonk, NY (US)

(72) Inventors: Charles J. Camp, Sugar Land, TX (US); Timothy J. Fisher, Cypress, TX (US); Cheng-Chung Song, Tucson, AZ (US); Robert W. Tillerson, Houston, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/576,958

(22) Filed: Dec. 19, 2014

(65) Prior Publication Data
US 2016/0179433 A1    Jun. 23, 2016

(51) Int. Cl.
G06F 3/06    (2006.01)

(52) U.S. Cl.
CPC .......... *G06F 3/0641* (2013.01); *G06F 3/0608* (2013.01); *G06F 3/0688* (2013.01)

(58) Field of Classification Search
CPC .. G06F 3/0641; G06F 3/0608; G06F 12/0246; G06F 17/3033; G06F 3/0679; G06F 3/064; G06F 3/0644; G06F 12/0253; G06F 12/123; G06F 3/0688; G06F 17/30156
See application file for complete search history.

(56) References Cited

U.S. PATENT DOCUMENTS

| 7,822,939 | B1  | 10/2010 | Veprinsky et al. |
| 8,407,191 | B1  | 3/2013  | Nanda            |
| 8,825,617 | B2  | 9/2014  | Haas et al.      |
| 2009/0089483 | A1* | 4/2009 | Tanaka ........... G06F 3/0608 711/103 |
| 2011/0055471 | A1  | 3/2011 | Thatcher et al.  |

(Continued)

OTHER PUBLICATIONS

Xia, Wen et al., "Combining Deduplication and Delta Compression to Achieve Low-Overhead Data Reduction on Backup Datasets", 2014 Data Compression Conference, Snowbird, Utah, Mar. 26-28, 2014, pp. 203-212.

*Primary Examiner* — Hashem Farrokh
(74) *Attorney, Agent, or Firm* — Francis Lammes; Stephen J. Walder, Jr.; Randall J. Bluestone

(57) ABSTRACT

A mechanism is provided for performing de-duplication process on a set of non-volatile memories as part of another process routinely performed on the set of non-volatile memories. A hash value of data stored at a first physical location in a non-volatile memory in the set of non-volatile memories is received from a non-volatile memory controller associated with the non-volatile memory. Responsive to the hash value matching one or more existing hash values for data stored at one or more other physical locations in the set of non-volatile memories, an optimal physical location is identified from the first physical location and the one or more other physical locations. Responsive to identifying the optimal physical location, a set of logical addresses associated with the hash values is updated to point to the optimal physical location. The non-optimal physical locations are further invalidated in order that the non-optimal physical locations are erased.

18 Claims, 5 Drawing Sheets

(56) References Cited

U.S. PATENT DOCUMENTS

| | | | |
|---|---|---|---|
| 2012/0137054 A1 | 5/2012 | Sadri et al. | |
| 2012/0260021 A1* | 10/2012 | Rudelic | G06F 3/0641 |
| | | | 711/103 |
| 2013/0326115 A1* | 12/2013 | Goss | G06F 3/0641 |
| | | | 711/103 |
| 2014/0281216 A1 | 9/2014 | Danilak | |
| 2015/0161040 A1* | 6/2015 | Chuang | G06F 12/0246 |
| | | | 711/103 |
| 2016/0077746 A1* | 3/2016 | Muth | G06F 3/0608 |
| | | | 711/159 |

* cited by examiner

DE-DUPLICATION AS PART OF OTHER ROUTINELY PERFORMED PROCESSES

BACKGROUND

The present application relates generally to an improved data processing apparatus and method and more specifically to mechanisms for performing de-duplication as part of other routinely preformed processes.

In computing, data de-duplication is a specialized data compression technique for eliminating redundant data in a storage system. The technique is used to improve storage utilization and may also be applied to network data transfers to reduce the number of bytes sent across a link. In the de-duplication process, data objects or chunks are identified and stored during a process of analysis. As the analysis continues, other objects are compared to the stored copies and, whenever a match occurs, the redundant object is replaced with a reference that points to the already stored object or chunk. Given that the same byte pattern may occur dozens, hundreds, or even thousands of times (the match frequency is a factor of the data characteristics and file size), the amount of data that must be stored or transferred may be greatly reduced.

Accordingly, storage-based data de-duplication inspects large volumes of data to identify large sections—such as entire files or large sections of files—that are identical, in order to store only one copy of the file. For example, a typical email system might contain 100 instances of the same one megabyte (MB) file attachment. Each time the email platform is backed up, all 100 instances of the attachment are saved, requiring 100 MB storage space. With data de-duplication, only one instance of the attachment is actually stored. The subsequent instances are referenced back to the saved copy for de-duplication, resulting in a compression ratio of roughly 100 to 1.

SUMMARY

In one illustrative embodiment, a method, in a data processing system, is provided for performing de-duplication process on a set of non-volatile memories as part of another process routinely performed on the set of non-volatile memories. The illustrative embodiment receives a hash value of data stored at a first physical location in a non-volatile memory in the set of non-volatile memories from a non-volatile memory controller associated with the non-volatile memory. The illustrative embodiment determines whether the hash value matches one or more existing hash values for data stored at one or more other physical locations in the set of non-volatile memories. The illustrative embodiment identifies an optimal physical location from the first physical location and the one or more other physical locations in response to the hash value matching one or more existing hash values for data stored at one or more other physical locations in the set of non-volatile memories. In the illustrative embodiment, the optimal physical location is based on at least one of a health indicator associated with each of the physical locations or physical attributes associated with each non-volatile memory drive where the physical locations reside. The illustrative embodiment updates a set of logical addresses associated with the hash values to point to the optimal physical location in response to identifying the optimal physical location. The illustrative embodiment invalidates the non-optimal physical locations in order that the non-optimal physical locations are erased thereby making the non-optimal physical locations available for new programming.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
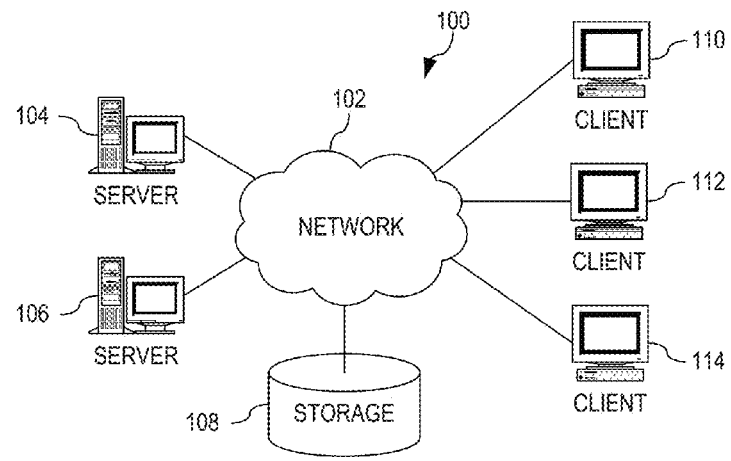
FIG. 1 is an example diagram of a distributed data processing system in which aspects of the illustrative embodiments may be implemented.

De-duplication of data may be performed in many ways at many different points in a storage system. One implementation of a de-duplication function may be in-line where the function is implemented as the data comes into the storage device. However, in-line implementations may have a negative impact to performance of a storage device due to the calculations involved in finding duplicate data. Another implementation of de-duplication is through post processing. Post processing may occur at the host, input/output (I/O) controller, raid controller, or on the drive itself. Post processing creates an overhead to the storage system in order to rescan and find duplicate data. The closer to the host the de-duplication function is implemented, the more the overhead impacts the entire storage system. If post-process de-duplication is performed outside of the drive, data must be read from the drive in order to find duplicates. This creates overhead and negatively impacts performance.

In order to reduce the negative impacts of in-line processing and post processing, the illustrative embodiments provide mechanisms for implementing the de-duplication function as part of other processes that are routinely performed on flash memory systems, such as a background relocation process, a read sweep process, or the like. By implementing the de-duplication function as part of one of these functions, the mechanisms reduce the overhead and negative performance impacts to the storage system. Therefore, there is no additional read overhead and any increased delay due to the de-duplication function does not impact host I/O since the logic is part of the background tasks of the flash controller and not the host I/O data path. In addition, although the embodiments are described using the term flash memory, it should be appreciated that embodiments of the present invention may also be used with other types of non-volatile random access memory, such as, for example and without limitation, nonvolatile random access memory (NVRAM), ferroelectric RAM (F-RAM), static random-access memory (SRAM), or the like.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure, or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
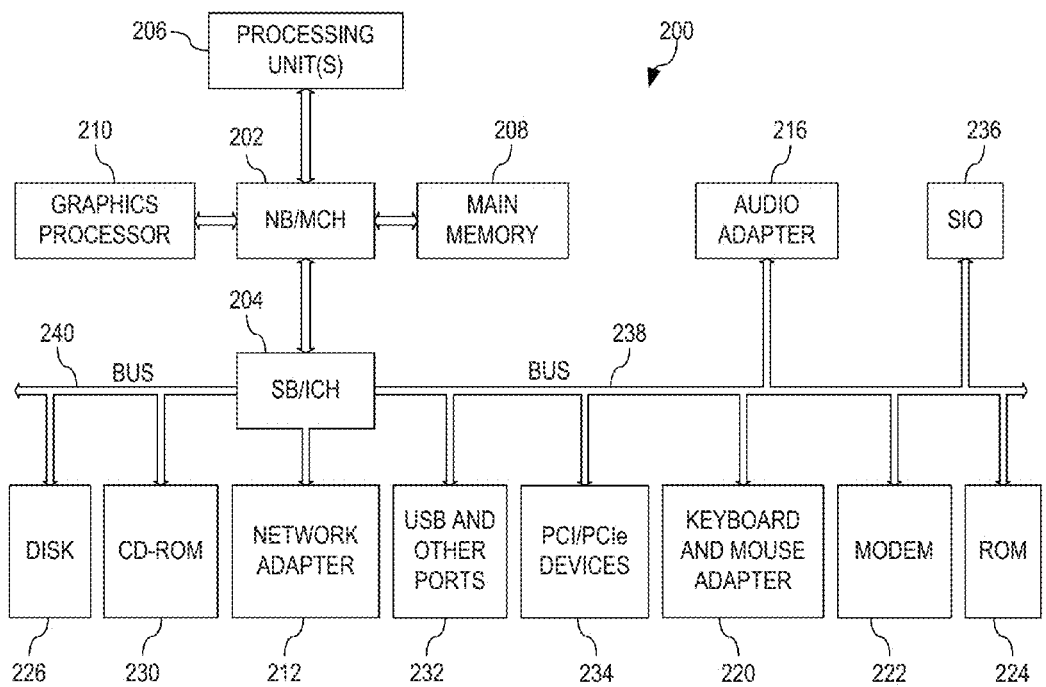
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including storage systems, client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As discussed briefly above, the illustrative embodiments provide mechanisms for implementing the de-duplication function as part of other processes that are routinely performed on flash memory systems, such as a background relocation process, a read sweep process, or the like. De-duplication involves many steps, many of which will not be described herein and may be chosen by a given implementation. However, the particular illustrative embodiment applies to de-duplication processes that use some form of hash generation of a given page of data. Flash based storage systems with pages of 4K bytes and 8K bytes work very well with most designs but the illustrative embodiments are not limited to such page sizes.

Figure 3:
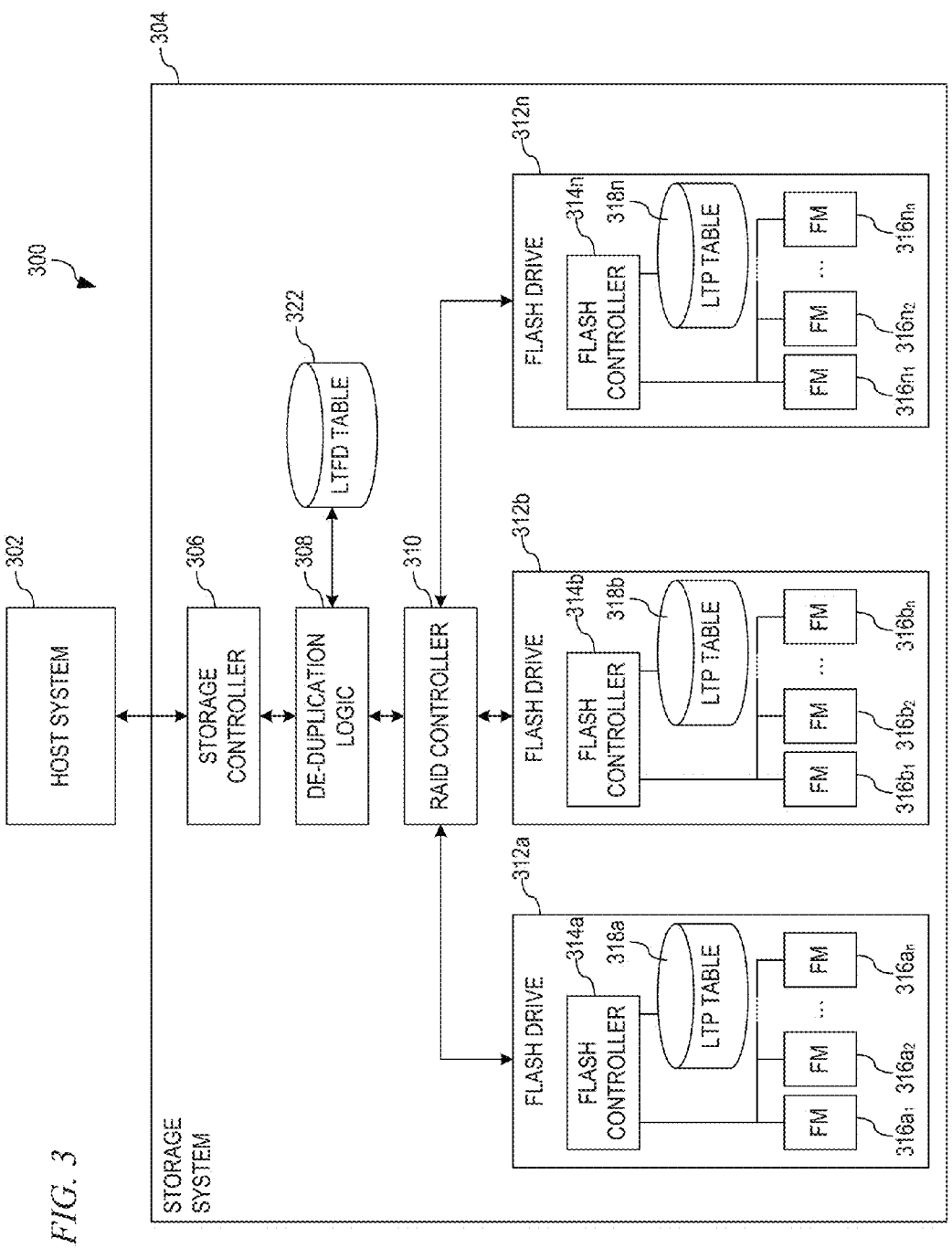
FIG. 3 depicts a functional block diagram of de-duplication logic in accordance with the illustrative embodiments.

FIG. 3 depicts a functional block diagram of de-duplication logic in accordance with the illustrative embodiments. Data processing system 300 comprises host system 302 and storage system 304. Storage system 304 comprises storage controller 306, de-duplication logic 308, redundant array of independent disks (RAID) controller 310, and a plurality of flash drives 312a-312n. In order to store data on one of flash drives 312a-312n, storage controller 306 receives the data and a logical address for the data from host system 302. Based on the logical address, storage controller 306 identifies the particular one of flash drives 312a-312n where the data is to be stored and sends the data to the particular flash drive, for example flash drive 312a, and stores the selected flash drive in a logical-to-flash drive (LTFD) table 322. Each of flash drives 312a-312n comprise a respective flash controller 314a-314n as well as a plurality of flash memories $316a_1$-$316a_n$-$316n_1$-$316n_n$. Upon flash drive 312a receiving the data and the logical address for the data from storage controller 306, flash controller 314a identifies a physical address in one of flash memories $316a_1$-$316a_n$ where the data will be programmed and stores this logical address to physical address relation in a local logical-to-physical (LTP) table 318a. Flash controller 314a then programs the data to the identified physical address in a block in one of flash memories $316a_1$-$316a_n$ depending on the location of the physical address. When programming data for the first time, a particular one of flash controllers 314a-314n that is performing the programming also generates metadata in its associated LTP table 318a-318n indicating that no hash value has been generated for the particular physical addresses. This metadata is utilized in later operations that are described below.

One of ordinary skill in the art will realize that, if the data is only of the page size which flash drive 312a operates, then flash controller 314a will only generate one physical address for the page that is to be stored in the particular block in the identified one of flash memories $316a_1$-$316a_n$. However, if the data is larger than the page size which flash drive 312a operates, flash controller 314a will identify a set of physical addresses for the pages that are to be stored in the particular block in the identified one of flash memories $316a_1$-$316a_n$. Therefore, a particular piece of data may reside in multiple pages and thus, multiple physical addresses, one for each page. As will also be evident to one of ordinary skill in the art, the data that is programmed on flash memories $316a_1$-$316a_n$ may be compressed data and the hash values that are generated may be based on the compressed data rather than the expanded data.

During one of the other processes that are routinely performed on the flash memories in flash drives 312a-312n, flash controllers 314a-314n performs a hash on the data associated with each logical address if no previous hash value has been generated based on the metadata associated with the logical address. In generating the hash value, flash controllers 314a-314n also identifies, for each generated hash value, that de-duplication has not been performed. That is, the de-duplication process operates on the hash values and thus, if no hash value has been generated, then de-duplication has not been performed. Flash controllers 314a-314n sends the generated hash value to de-duplication logic 308.

As each hash value is received, de-duplication logic 308 places the logical addresses for which the hash values are generated in a de-duplication queue, so that de-duplication will be performed. Upon the hash value being generated and the logical address being placed in the de-duplication queue, de-duplication logic 308 determines whether the hash value associated with the logical address is identical to the generated hash value already existing in LTFD table 322. If there is no matching hash value, de-duplication logic 308 instructs flash controller 314 to update the metadata in the LTP table 318 to indicate a hash value has been generated. De-duplication logic 308 also removes the logical address from the de-duplication queue.

However, if there is a matching hash value, de-duplication logic 308 instructs the flash controller 314 to update the LTP table 318 so that, for example, the logical address for which the hash value has been generated points to a physical address associated with the matching logical address. That is, if logical address 0 points to physical address A and has a hash value that matches the generated hash value for logical address 2, then logical address 2 will be updated to point to physical address A and physical address C that originally stored the data associated with logical address 2 will be invalidated and thus, will subsequently be erased so that new data may be stored at the physical address. However, in an alternate embodiment, the logical address for which the hash value has been generated may be retained to point to the already established physical address and the matching logical address may be updated to point to the physical address associated with the logical address for which the hash value has just been generated. That is, if logical address 0 points to physical address A and has a hash value that matches the generated hash value for logical address 2 that points to physical address C, then logical address 0 may be updated to point to physical address C and physical address A will be invalidated and thus, will subsequently be erased so that new data may be stored at the physical address. De-duplication logic 308 also instructs flash controller 314 to update the metadata in the LTP table 318 to indicate a hash value has been generated and removes the logical address from the de-duplication queue.

As may be apparent to one of ordinary skill in the art, data programmed in one flash memory of one flash drive may be the same as data in another flash memory of another flash drive. In order to account for these types of matches, de-duplication logic 308 utilizes LTFD table 322 and LTP tables 318a-318n to provide a tiered deduplication process. That is, for example, if flash memory $316a_1$ in flash drive 312a includes one copy of the data determined to match a copy of the data included in flash memory $316b_2$ in flash drive 312b based on matching hash values, then during de-duplication, de-duplication logic 308 may update LTFD table 322 so that access to the logical address for flash memory $316a_1$ in flash drive 312a points to the logical address for flash memory $316b_2$ in flash drive 312b, with the LTP table 318b providing the logical to physical address relation once the access is directed to flash drive 312b. Furthermore, the physical address associated with the logical address in LTP table 318a will be invalidated and thus, will subsequently be erased so that new data may be stored at the physical address. This invalidation may be performed since any access to the logical address will be redirected to flash drive 312b by storage controller 306 using LTFD table 322 when an access to the logical address is received from host system 302. However, if an access to the logical address in flash memory $316a_1$ in flash drive 312a is an update to the data, storage controller 302 will handle the access as a new programming such that the data is programmed to a new block and both the LTP table 318a associated with the flash drive 312a of the new block and the LTFD table 322 will be updated accordingly.

In accordance with illustrative embodiments, de-duplication logic 308 may choose one physical address over another physical address (an optimal location) based upon health information associated with the physical address, such as:
  a number of times the block associated with the physical address has been programmed,
  a number of errors recorded for the block associated with the physical address,
  a number of time the block has been erased,
  a number of reads since the last programming of the physical address, or
  a time since the last programming of the physical address.
That is, once data is stored at a physical address within a block on flash memories $316a_1$-$316a_n$-$316n_1$-$316n_n$, the block in which the data is programmed has retention issues, which is a known to occur with all flash memories. Thus, health information associated with the block within the flash memory, which is maintained by the individual flash memory controllers, may be passed up to de-duplication logic 308 coincident with the passing of hash values. Therefore, in determining which copy of the physical data to keep, de-duplication logic 308 takes into account the health of the block and/or flash memory. In accordance with the illustrative embodiments, each of the health information values may have a predetermined threshold that is utilized before an action based on the health information is implemented.

Additionally, in determining which copy (optimal location) of the physical data to keep, de-duplication logic 308 may take into account a number of copies of the data as well as physical attributes associated with the flash memories where the copies of the data were found, such as:
  a type of the flash memory (enterprise versus consumer) associated with the physical address,
  a quality of the flash memory associated with the physical address, a data retention indicator of the flash memory associated with the physical address, or a capacity of the flash memory.

Thus, upon identifying two or more logical addresses that have matching hash values indicating uncompressed or compressed data stored at different pages within the flash memories $316a_1$-$316a_n$-$316n_1$-$316n_n$ are identical, de-duplication logic 308 utilizes one or more of a number of copies of the data, physical attributes associated with the flash memories, or health information associated with the physical address to identify which physical location should retain the data stored at the physical address and which logical addresses should be updated to point to the identified physical location, thereby invalidating the other physical addresses so that those physical addresses will subsequently be erased in order for new data to be stored at those physical addresses.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
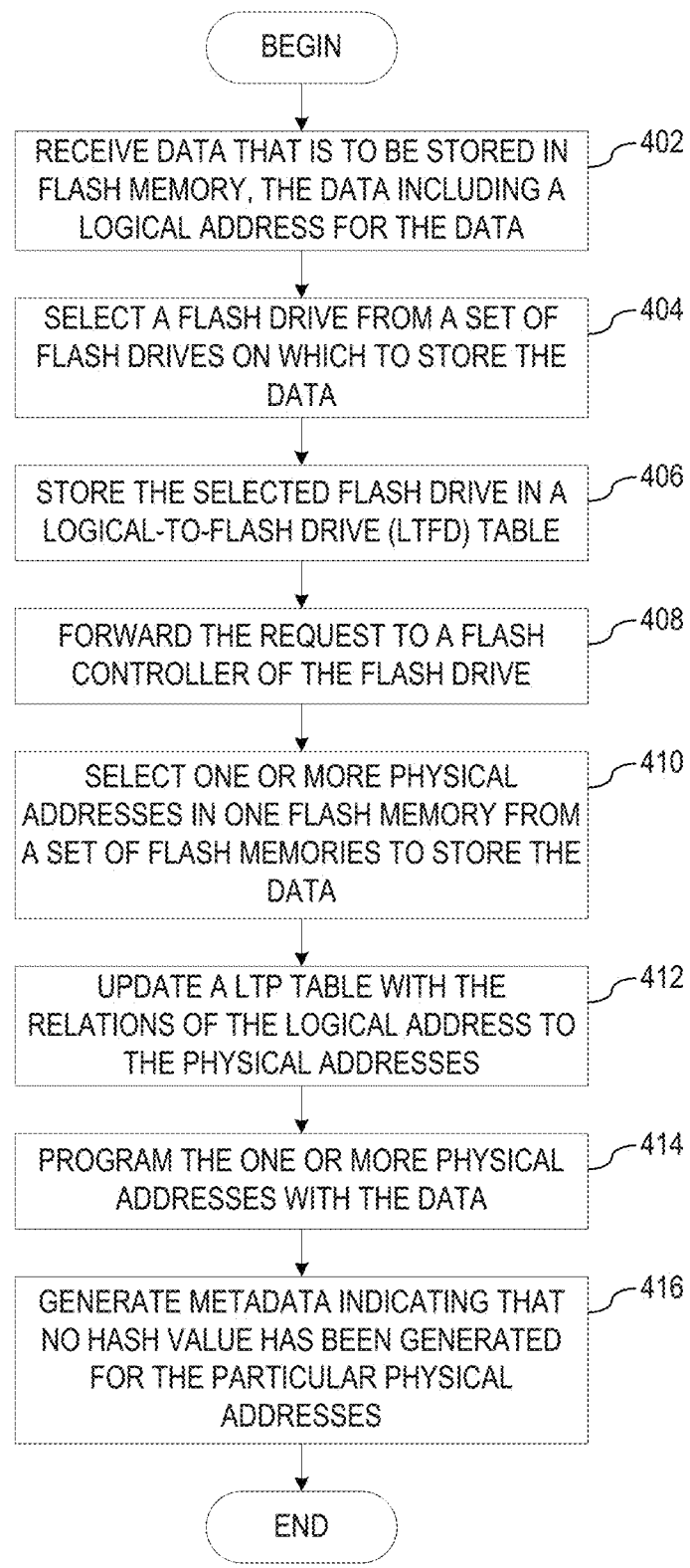
FIG. 4 depicts a flowchart of a programming operation performed for received data to one or more pages in a block of flash memory in accordance with an illustrative embodiment.

FIG. 4 depicts a flowchart of a programming operation performed for received data to one or more pages in block of flash memory in accordance with an illustrative embodiment. As the operation begins, a storage controller receives data that is to be stored in flash memory, the data including a logical address for the data (step 402). The storage controller selects a flash drive from a set of flash drives on which to store the data (step 404), stores the selected flash drive in a logical-to-flash drive (LTFD) table (step 406), and forwards the request to a flash controller of the flash drive (step 408). The flash controller selects one or more physical addresses in one flash memory from a set of flash memories to store the data (step 410), updates a logical to physical (LTP) table with the relations of the logical address to the physical addresses (step 412), and programs the one or more physical addresses with the data (step 414). The flash controller also generates metadata indicating that no hash value has been generated for the particular physical addresses (step 416), this metadata is stored in the LTP table. The operation terminates thereafter.

Figure 5A:
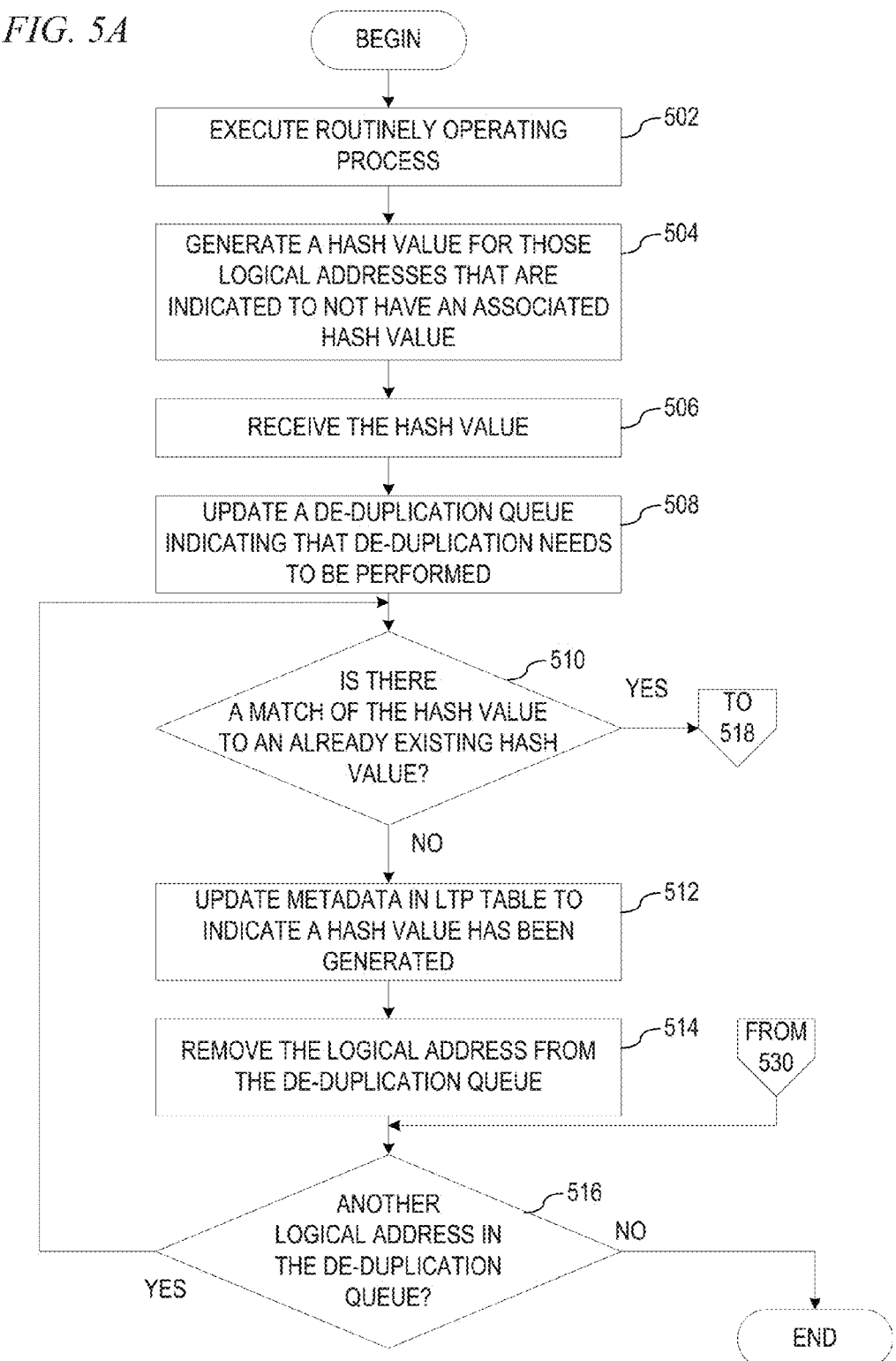
FIGS. 5A and 5B depict a flowchart of the de-duplication operation performed as part of other processes that are routinely performed on the flash memories in accordance with the illustrative embodiments.
Figure 5B:
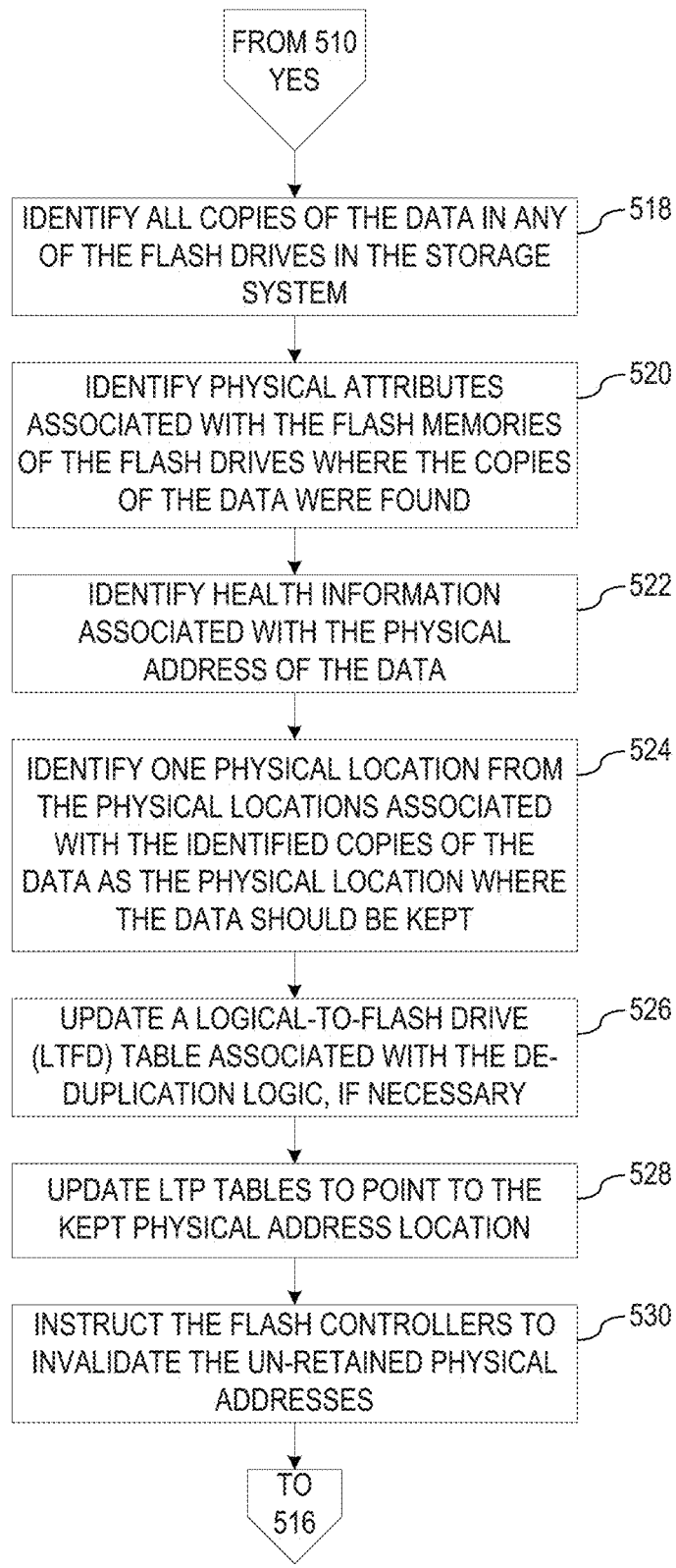

FIGS. 5A and 5B depict a flowchart of the de-duplication operation performed as part of other processes that are routinely performed on the flash memories in accordance with the illustrative embodiments. As the operation begins, a routinely operating process, such as a background relocation process, a read sweep process, or the like, executes on the flash memories (step 502). During the execution of the process, a flash controller associated with a particular flash memory generates a hash value for those logical addresses that are indicated to not have an associated hash value as per the logical-to-physical (LTP) table of the flash drive (step 504). For each generated hash value, de-duplication logic receives the hash value (step 506) and updates a de-duplication queue indicating that de-duplication needs to be performed for the logical address associated with the hash value (step 508). In performing de-duplication based on the logical addresses in the de-duplication queue, the de-duplication logic determines whether there is a match of the hash value to an already existing hash value (step 510).

If at step 510 the de-duplication logic determines that there is not a match to any existing hash value, then the de-duplication logic instructs the flash controller to update the metadata in its LTP table to indicate a hash value has been generated (step 512). The de-duplication logic also removes the logical address from the de-duplication queue (step 514). The de-duplication logic then determines whether there is another logical address in the de-duplication queue (step 516). If at step 516 the de-duplication logic determines that there is another logical address in the de-duplication queue, then the operation returns to step 510. If at step 516 the de-duplication logic determines that there is not another logical address in the de-duplication queue, the operation terminates.

If at step 510 the de-duplication logic determines that there is a match to an existing hash value, the de-duplication logic identifies all copies of the data in any of the flash drives in the storage system (step 518). The de-duplication logic also identifies physical attributes associated with the flash memories of the flash drives where the copies of the data were found (step 520). The physical attributes associated with the flash memories where the copies of the data were found may be, for example:

a type of the flash memory (enterprise versus consumer) associated with the physical address,
  a quality of the flash memory associated with the physical address,
  a data retention indicator of the flash memory associated with the physical address, or
  a capacity of the flash memory.

The de-duplication logic also identifies health information associated with the physical address of the data (step 522). The health information associated with the physical address of the data may be, for example:

a number of times the block associated with the physical address has been programmed,
  a number of errors recorded for the block associated with the physical address,
  a number of time the block has been erased,
  a number of reads since the last programming of the physical address, or
  a time since the last programming of the physical address.

This health information associated with the block within the flash memory or the flash memory itself may be passed up to the flash controller during one of the other processes that are routinely performed on the flash memories and/or generated by flash controller as data is programmed to the physical addresses.

Based on one or more of these identified features, the de-duplication logic identifies one physical location from the physical locations associated with the identified copies of the data as the physical location where the data should be kept (step 524). The de-duplication logic the updates a logical-to-flash drive (LTFD) table associated with the de-duplication logic, if necessary, (step 526) as well as instructs the associated flash controller(s) to update their LTP tables to point to the kept physical address location (step 528). After the flash controllers update their LTP tables accordingly, the de-duplication logic instructs the flash controllers to invalidate the un-retained physical addresses (step 530) so that those physical addresses will be erased in order that new data may be stored at the physical addresses. The operation then proceeds to step 516.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying two or more logical addresses that have matching hash values indicating uncompressed or compressed data stored at different pages within the flash memories are identical. The mechanisms utilize one or more of a number of copies of the data, physical attributes associated with the flash memories, or health information associated with the physical address to identify which physical location should retain the data stored at the physical address and which logical addresses should be updated to point to the identified physical location. Those physical addresses that are un-retained are invalidated so that those physical addresses will subsequently be erased in order for new data to be stored at those physical addresses.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for performing de-duplication process on a set of non-volatile memories as part of another process routinely performed on the set of non-volatile memories, the method comprising:

responsive to a read sweep process being performed, wherein the read sweep process is the other process routinely performed on the set of non-volatile memories, and responsive to determining that a hash value has not being generated for data stored at a first physical location while performing the read sweep process:

receiving the hash value for the data stored at the first physical location in a non-volatile memory in the set of non-volatile memories from a non-volatile memory controller associated with the non-volatile memory that generates the hash value for the data stored at the first physical location in response to determining that the hash value has not being generated for the data stored at the first physical location while performing the read sweep process;

determining whether the hash value matches one or more existing hash values for data stored at one or more other physical locations in the set of non-volatile memories;

responsive to the hash value matching one or more existing hash values for data stored at one or more other physical locations in the set of non-volatile memories, identifying an optimal physical location from the first physical location and the one or more other physical locations, wherein the optimal physical location is based on at least one of a health indicator associated with each of the physical locations or physical attributes associated with each non-volatile memory drive where the physical locations reside;

responsive to identifying the optimal physical location, updating a set of logical addresses associated with the hash values to point to the optimal physical location; and invalidating the non-optimal physical locations in order that the non-optimal physical locations are erased thereby making the non-optimal physical locations available for new programming.

2. The method of claim 1, wherein updating the set of logical addresses associated with the hash values to point to the optimal physical location comprises at least one of:

updating a logical-to-physical table associated with the non-volatile memory so that the logical address points to the optimal physical address; or updating a logical-to-non-volatile memory drive table so that the logical address of one non-volatile memory in one non-volatile memory drive points to another logical address of another non-volatile memory in a different non-volatile memory drive.

3. The method of claim 1, wherein the hash value for data stored at the first physical location in the non-volatile memory from the non-volatile memory controller associated with the non-volatile memory is received based on metadata stored in a logical-to-physical table indicating that the hash value is to be generated.

4. The method of claim 1, wherein the health indicator associated with each of the physical locations comprises one or more of: a number of times a block associated with the physical location has been programmed, a number of errors recorded for the block associated with the physical location, a number of times the block associated with the physical location has been erased, a number of reads since the last programming of the physical location, or a time since the last programming of the physical location.

5. The method of claim 1, wherein the physical attributes associated with each of the non-volatile memory drives where the physical locations reside comprises at least one of: a type of the non-volatile memory associated with the physical location, a quality of the non-volatile memory associated with the physical location, a data retention indicator of the non-volatile memory associated with the physical location, or a capacity of the non-volatile memory.

6. The method of claim 1, wherein the hash value for data is at least one of a hash value for uncompressed data or a hash value for compressed data.

7. A computer program product comprising a non-transitory computer readable storage medium having a computer readable program for performing de-duplication process on a set of non-volatile memories as part of another process routinely performed on the set of non-volatile memories stored therein, wherein the computer readable program, when executed on a computing device, causes the computing device to:

responsive to a read sweep process being performed, wherein the read sweep process is the other process routinely performed on the set of non-volatile memories, and responsive to determining that a hash value has not being generated for data stored at a first physical location while performing the read sweep process:

receive the hash value for the data stored at the first physical location in a non-volatile memory in the set of non-volatile memories from a non-volatile memory controller associated with a non-volatile memory that generates the hash value for the data stored at the first physical location in response to determining that the hash value has not being generated for the data stored at the first physical location while performing the read sweep process;

determine whether the hash value matches one or more existing hash values for data stored at one or more other physical locations in the set of non-volatile memories;

responsive to the hash value matching one or more existing hash values for data stored at one or more other physical locations in the set of non-volatile memories, identify an optimal physical location from the first physical location and the one or more other physical locations, wherein the optimal physical location is based on at least one of a health indicator associated with each of the physical locations or physical attributes associated with each non-volatile memory drive where the physical locations reside;

responsive to identifying the optimal physical location, update a set of logical addresses associated with the hash values to point to the optimal physical location; and invalidate the non-optimal physical locations in order that the non-optimal physical locations are erased thereby making the non-optimal physical locations available for new programming.

8. The computer program product of claim 7, wherein the computer readable program to update the set of logical addresses associated with the hash values to point to the optimal physical location further causes to computing device to perform at least one of:

updating a logical-to-physical table associated with the non-volatile memory so that the logical address points to the optimal physical address; or updating a logical-to-non-volatile memory drive table so that the logical address of one non-volatile memory in one non-volatile memory drive points to another logical address of another non-volatile memory in a different non-volatile memory drive.

9. The computer program product of claim 7, wherein the hash value for data stored at the first physical location in the non-volatile memory from the non-volatile memory controller associated with the non-volatile memory is received based on metadata stored in a logical-to-physical table indicating that the hash value is to be generated.

10. The computer program product of claim 7, wherein the health indicator associated with each of the physical locations comprises one or more of: a number of times a block associated with the physical location has been programmed, a number of errors recorded for the block associated with the physical location, a number of times the block associated with the physical location has been erased, a number of reads since the last programming of the physical location, or a time since the last programming of the physical location.

11. The computer program product of claim 7, wherein the physical attributes associated with each of the non-volatile memory drives where the physical locations reside comprises at least one of: a type of the non-volatile memory associated with the physical location, a quality of the non-volatile memory associated with the physical location, a data retention indicator of the non-volatile memory associated with the physical location, or a capacity of the non-volatile memory.

12. The computer program product of claim 7, wherein the hash value for data is at least one of a hash value for uncompressed data or a hash value for compressed data.

13. An apparatus for performing de-duplication process on a set of non-volatile memories as part of another process routinely performed on the set of non-volatile memories comprising:

a processor; and a memory coupled to the processor, wherein the memory comprises instructions which, when executed by the processor, cause the processor to:

responsive to a read sweep process being performed, wherein the read sweep process is the other process routinely performed on the set of non-volatile memories, and responsive to determining that a hash value has not being generated for data stored at a first physical location while performing the read sweep process:

receive the hash value for the data stored at the first physical location in a non-volatile memory in the set of non-volatile memories from a non-volatile memory controller associated with a non-volatile memory that generates the hash value for the data stored at the first physical location in response to determining that the hash value has not being generated for the data stored at the first physical location while performing the read sweep process;

determine whether the hash value matches one or more existing hash values for data stored at one or more other physical locations in the set of non-volatile memories;

responsive to the hash value matching one or more existing hash values for data stored at one or more other physical locations in the set of non-volatile memories, identify an optimal physical location from the first physical location and the one or more other physical locations, wherein the optimal physical location is based on at least one of a health indicator associated with each of the physical locations or physical attributes associated with each non-volatile memory drive where the physical locations reside;

responsive to identifying the optimal physical location, update a set of logical addresses associated with the hash values to point to the optimal physical location; and invalidate the non-optimal physical locations in order that the non-optimal physical locations are erased thereby making the non-optimal physical locations available for new programming.

14. The apparatus of claim 13, wherein the instructions to update the set of logical addresses associated with the hash values to point to the optimal physical location further cause to processor to perform at least one of:

updating a logical-to-physical table associated with the non-volatile memory so that the logical address points to the optimal physical address; or updating a logical-to-non-volatile memory drive table so that the logical address of one non-volatile memory in one non-volatile memory drive points to another logical address of another non-volatile memory in a different non-volatile memory drive.

15. The apparatus of claim 13, wherein the hash value for data stored at the first physical location in the non-volatile memory from the non-volatile memory controller associated with the non-volatile memory is received based on metadata stored in a logical-to-physical table indicating that the hash value is to be generated.

16. The apparatus of claim 13, wherein the health indicator associated with each of the physical locations comprises one or more of: a number of times a block associated with the physical location has been programmed, a number of errors recorded for the block associated with the physical location, a number of times the block associated with the physical location has been erased, a number of reads since the last programming of the physical location, or a time since the last programming of the physical location.

17. The apparatus of claim 13, wherein the physical attributes associated with each of the non-volatile memory drives where the physical locations reside comprises at least one of: a type of the non-volatile memory associated with the physical location, a quality of the non-volatile memory associated with the physical location, a data retention indicator of the non-volatile memory associated with the physical location, or a capacity of the non-volatile memory.

18. The apparatus of claim 13, wherein the hash value for data is at least one of a hash value for uncompressed data or a hash value for compressed data.

\* \* \* \* \*